US007688790B1

(12) United States Patent
Sayers et al.

(10) Patent No.: US 7,688,790 B1
(45) Date of Patent: Mar. 30, 2010

(54) METHOD AND APPARATUS FOR INTERCONNECTING A PRIVATE CELLULAR NETWORK TO A PUBLIC CELLULAR NETWORK

(75) Inventors: Ian Leslie Sayers, Redwood City, CA (US); Paul Jan Long, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1086 days.

(21) Appl. No.: 10/831,408

(22) Filed: Apr. 23, 2004

Related U.S. Application Data

(63) Continuation of application No. 10/752,114, filed on Jan. 6, 2004, now Pat. No. 7,496,103, which is a continuation of application No. 09/408,967, filed on Sep. 29, 1999, now Pat. No. 6,687,243.

(51) Int. Cl.
*H04W 4/00* (2009.01)
(52) U.S. Cl. .................. 370/338; 370/352; 370/389
(58) Field of Classification Search .............. 370/328, 370/338, 352, 356, 389; 455/432.1, 433, 455/560
See application file for complete search history.

(56) References Cited

U.S. PATENT DOCUMENTS

| 5,212,831 | A | | 5/1993 | Chuang et al. ............. 455/54.1 |
| 5,351,237 | A | * | 9/1994 | Shinohara et al. ........... 370/392 |
| 5,581,597 | A | | 12/1996 | Dent et al. .................. 379/59 |
| 5,602,843 | A | | 2/1997 | Gray ......................... 370/338 |
| 5,771,275 | A | * | 6/1998 | Brunner et al. ............. 370/385 |
| 5,796,729 | A | | 8/1998 | Greaney et al. ............. 370/345 |

(Continued)

FOREIGN PATENT DOCUMENTS

EP  0 766 427 A2  4/1997

(Continued)

OTHER PUBLICATIONS

Chuang, J.C.I., *Operation and Performance of a Self-Organizing Frequency Assignment Method for TDMA Portable Radio*, Proceedings of the Global Telecommunications Conference and Exhibition (GLOBECOM), USA, vol. 2: 1548-1552 ( Dec. 1990).

(Continued)

*Primary Examiner*—Jayanti K Patel
*Assistant Examiner*—Bo Hui A Zhu
(74) *Attorney, Agent, or Firm*—Baker Botts L.L.P.

(57) ABSTRACT

A communications system extends over a cellular region formed of a plurality of wireless cells where each cell covers a portion of the cellular region. Each cell has a station which is responsible for communication with the cellular subscriber. In order to for the call to be properly managed in the public cellular domain, responsibility for call handling and processing must first be managed by the public MSC. Call handling with the public MSC for a private cellular subscriber first requires the exchange of information between the two systems. This is facilitated through the exchange of MAP and A interface signaling between the private and public cellular systems. Since this information on the private network is normally transmitted via IP, this information must be converted to standard SS7 based MAP and A protocol signaling in order for the public MSC to process.

31 Claims, 8 Drawing Sheets

U.S. PATENT DOCUMENTS

| | | | | |
|---|---|---|---|---|
| 5,802,473 | A | | 9/1998 | Rutledge et al. ............ 455/441 |
| 5,818,824 | A | * | 10/1998 | Lu et al. ..................... 370/328 |
| 5,867,495 | A | * | 2/1999 | Elliott et al. ................ 370/352 |
| 5,887,256 | A | * | 3/1999 | Lu et al. ................... 455/426.1 |
| 5,970,059 | A | * | 10/1999 | Ahopelto et al. ............ 370/338 |
| 5,978,672 | A | * | 11/1999 | Hartmaier et al. ........... 455/413 |
| 6,014,377 | A | * | 1/2000 | Gillespie .................... 370/351 |
| 6,032,045 | A | | 2/2000 | Mimura ...................... 455/446 |
| 6,038,452 | A | | 3/2000 | Strawczynski et al. ...... 455/446 |
| 6,073,029 | A | * | 6/2000 | Smith et al. ................. 455/555 |
| 6,112,092 | A | | 8/2000 | Benveniste ................. 455/450 |
| 6,131,031 | A | | 10/2000 | Lober et al. ................. 455/444 |
| 6,167,040 | A | | 12/2000 | Haeggstrom ................ 370/352 |
| 6,173,186 | B1 | | 1/2001 | Dalley ........................ 455/446 |
| 6,181,935 | B1 | | 1/2001 | Gossman et al. ............ 455/433 |
| 6,212,395 | B1 | * | 4/2001 | Lu et al. ..................... 455/463 |
| 6,216,005 | B1 | | 4/2001 | Agrawal et al. ............. 455/445 |
| 6,223,031 | B1 | | 4/2001 | Näslund .................... 455/423 |
| 6,223,055 | B1 | | 4/2001 | Cyr ............................ 455/555 |
| 6,243,581 | B1 | | 6/2001 | Jawanda .................... 455/432 |
| 6,253,088 | B1 | | 6/2001 | Wenk et al. ................ 455/462 |
| 6,256,612 | B1 | | 7/2001 | Vo et al. .................... 704/500 |
| 6,317,609 | B1 | | 11/2001 | Alperovich et al. ......... 455/556 |
| 6,411,632 | B2 | * | 6/2002 | Lindgren et al. ............ 370/466 |
| 6,466,571 | B1 | * | 10/2002 | Dynarski et al. ............ 370/352 |
| 6,507,577 | B1 | * | 1/2003 | Mauger et al. .............. 370/356 |
| 6,594,258 | B1 | * | 7/2003 | Larson et al. ............... 370/353 |

FOREIGN PATENT DOCUMENTS

WO     WO 98/02010     1/1998

OTHER PUBLICATIONS

Thom, G.A., *H.323: The Multimedia Communications Standard for Local Area Networks*, IEEE Communications Magazine, pp. 52-56 (Dec. 1996).

* cited by examiner

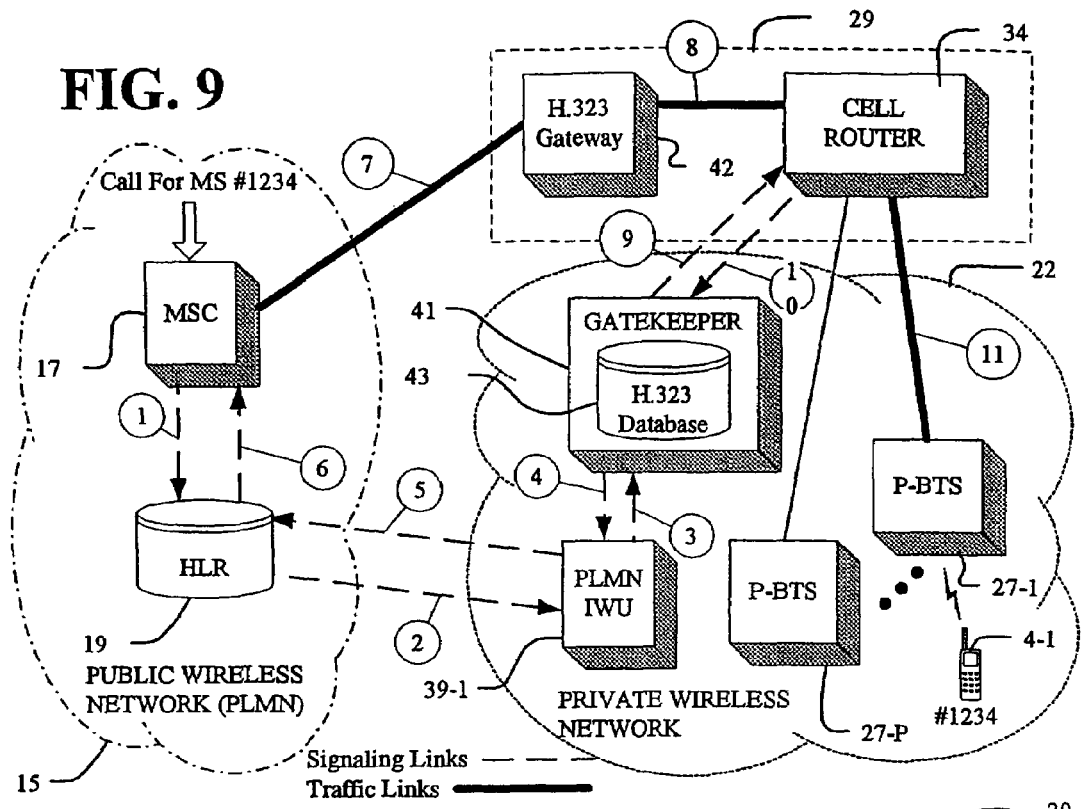
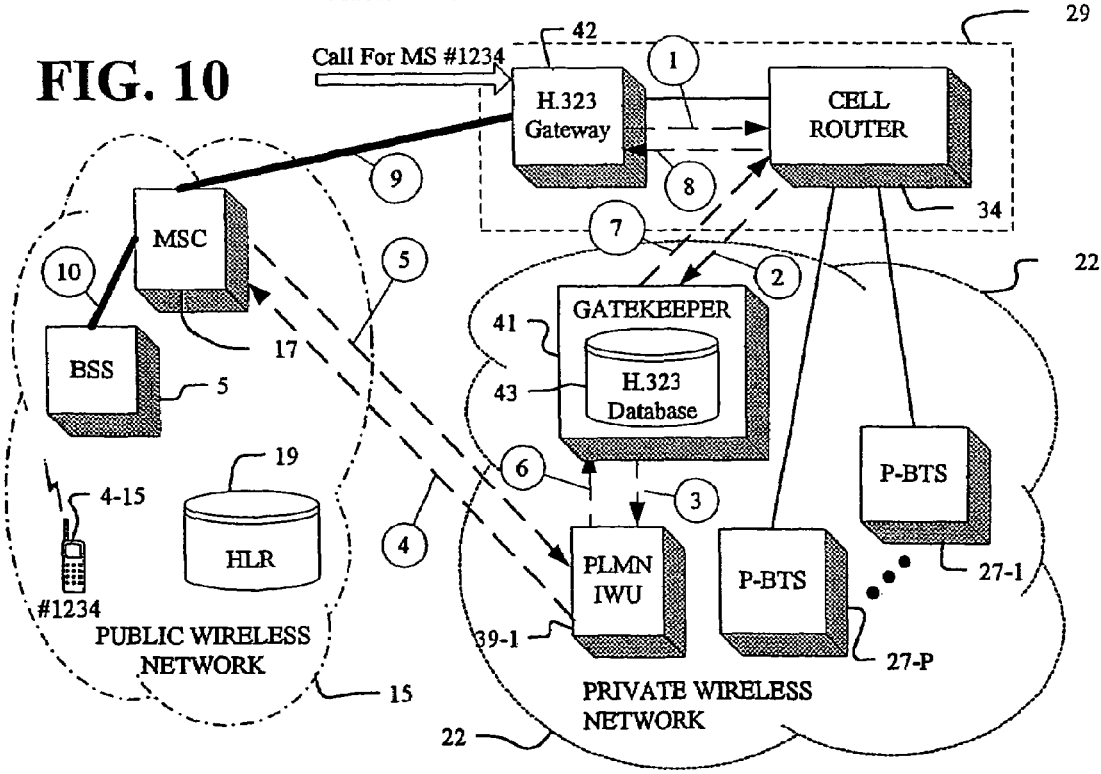

METHOD AND APPARATUS FOR INTERCONNECTING A PRIVATE CELLULAR NETWORK TO A PUBLIC CELLULAR NETWORK

CROSS REFERENCE TO RELATED APPLICATION

This application is a continuation of U.S. application Ser. No. 10/752,114 filed Jan. 6, 2004 now U.S. Pat. No. 7,496,103 and entitled "Method and Apparatus for Interconnecting a Private Cellular Network to a Public Cellular Network which is a continuation of U.S. application Ser. No. 09/408,967 filed Sep. 29, 1999 and entitled Method and Apparatus for Integrated Wireless Communications in Private and Public Network Environments", now U.S. Pat. No. 6,687,243.

This application is related to U.S. application Ser. No. 09/188,856 filed Nov. 9, 1998 and entitled "Method And Apparatus For Integrated Wireless Communications In Private And Public Network Environments", now U.S. Pat. No. 6,539,237 and U.S. application Ser. No. 09/271,596 filed Mar. 17, 1999 and entitled "Method And Apparatus For Controlling Wireless Networks".

TECHNICAL FIELD OF THE INVENTION

The present invention is a method and apparatus that provides for interconnection of private and public cellular networks, facilitating the exchange of subscriber profile and network data between systems.

BACKGROUND OF THE INVENTION

Conventional Cellular Systems

Present day cellular mobile telephone systems provide for a large and increasing demand for mobile services. Cellular systems "reuse" frequency within a group of cells to provide wireless two-way radio frequency (RF) communication to large numbers of users. Each cell covers a small geographic area and collectively a group of adjacent cells covers a larger geographic region. Each cell has a fraction of the total amount of RF spectrum available to support cellular users. Cells are of different sizes (for example, macro-cell or micro-cell) and are generally fixed in capacity. The actual shapes and sizes of cells are complex functions of the terrain, the man-made environment, the quality of communication and the user capacity required. Cells are connected to each other via land lines or microwave links and to the public-switched telephone network (PSTN) through telephone switches that are adapted for mobile communication. The switches provide for the hand-off of users from cell to cell and thus typically from frequency to frequency as mobile users move between cells.

In conventional cellular systems, each cell has a base station with RF transmitters and RF receivers co-sited for transmitting and receiving communications to and from cellular users in the cell. The base station employs forward RF frequency bands (carriers) to transmit forward channel communications to users and employs reverse RF earners to receive reverse channel communications from users in the cell.

The forward and reverse channel communications use separate frequency bands so that simultaneous transmissions in both directions are possible. This operation is referred to as frequency division duplex (FDD) signaling. In time division duplex (TDD) signaling, the forward and reverse channels take turns using the same frequency band.

The base station in addition to providing RF connectivity to users also provides connectivity to a Mobile Services Switching Center (MSC). In a typical cellular system, one or more MSCs will be used over the covered region. Each MSC can service a number of base stations and associated cells in the cellular system and supports switching operations for routing calls between other systems (such as the PSTN) and the cellular system or for routing calls within the cellular system.

Base stations are typically controlled from the MSC by means of a Base Station Controller (BSC). The BSC assigns RF carriers to support calls, coordinates the handoff of mobile users between base stations, and monitors and reports on the status of base stations. The number of base stations controlled by a single MSC depends upon the traffic at each base station, the cost of interconnection between the MSC and the base stations, the topology of the service area and other similar factors.

A handoff between base stations occurs, for example, when a mobile user travels from a first cell to an adjacent second cell. Handoffs also occur to relieve the load on a base station that has exhausted its traffic-carrying capacity or where poor quality communication is occurring. The handoff is a communication transfer for a particular user from the base station for the first cell to the base station for the second cell. During the handoff in conventional cellular systems, there may be a transfer period of time during which the forward and reverse communications to the mobile user are severed with the base station for the first cell and are not established with the second cell.

In time division multiple access (TDMA) systems, multiple channels are defined using the same carrier. The separate channels each transmit discontinuously in bursts which are timed so as not to interfere with the other channels on that carrier. Typically, TDMA implementations also employ FDMA techniques. Carriers are reused from cell to cell in an FDMA scheme, and on each carrier, several channels are defined using TDMA methods. The Global System for Mobile Communications (GSM), PCS1900, IS-136, and PDC standards are examples of TDMA methods in current use.

The present specification uses a GSM system for purposes of explanation but the present invention applies to any wireless system protocol.

GSM Cellular Systems

The GSM system architecture is described, for example, in detail by M. Mouly and M.-B. Pautet; The GSM System for Mobile Communications, 1992 and Mouly and M.-B. Pautet, *GSM Protocol Architecture: Radio Sub-system Signaling*, IEEE 41st Vehicular Technology Conference, 1991. The following sections highlight some unique aspects of GSM systems.

The GSM system provides many advanced services, including: ISDN compatible supplementary services; Global roaming among GSM networks and other network types; advanced packet data services.

GSM System Architecture

There is a very comprehensive set of GSM Specifications which define the three major components of any GSM network, namely, the Mobile Station (MS), Base Station Sub-System (BSS) and the Network Sub-System (NSS).

Base Station Subsystem (BSS)

The Base Station Subsystem (BSS) is subdivided into two main entities, the Base Transceiver Station (BTS) and the Base Station Controller (BSC). The BTS includes the radio transceivers that define the radio cell and supports the radio (Um) interface link to the mobile station. The BTS further supports the defined channel coding, encryption and speech coding functions. The BTS interfaces to the BSC via the Abis-interface.

The Base Station Controller (BSC) manages the radio resources of multiple BTSs. The BSC controls all of the functions related to the radio network, including the allocation and release of radio resources and control of radio interface hand-overs. The BSC interfaces to the MSC via the A-interface.

Network Subsystem

The network subsystem (NSS) comprises four components these are, the Mobile services Switching Center (MSC), Home Location Register (HLR), Visitor Location Register (VLR), Authentication Centre (AuC) and the Equipment Identity Register (EIR).

The main part of the network subsystem (NSS) is provided by the Mobile services Switching Center (MSC). The MSC provides the ability to track the mobile user, switch calls to/from the user to the PSTN/ISDN/PLMN (public land mobile network) and maintain contact with the mobile user via radio handovers.

The GSM PLMN (GSM public land mobile network) contains two database functions related to the mobility of the user these are the Home Location Register (HLR) and the Visited Location Register (VLR).

The Home Location Register (HLR) is used by the operator to maintain data on all their subscribers. The subscriber data includes both fixed data, such as International Mobile Subscriber Identity (IMSI), subscriber MSISDN number and selected supplementary services, and dynamic data such as whereabouts of the mobile user and current settings for any supplementary services. Whenever a mobile users roams into a new Visitor Location Register (VLR) area the HLR downloads the subscriber data to the VLR. The HLR is also required to deal with mobile terminating calls by routing the call to the correct VLR for further processing.

The Visitor Location Register (VLR) is used as a local cache to store the subscriber data near the current location of the mobile user. Once the VLR has downloaded the subscriber data the mobile user can begin to use the services provided by the network. The process of downloading the user data and establishing a presence in a particular location is called roaming.

In order to prevent fraudulent use of the network the GSM PLMN also contains two further databases the Authentication Centre (AUC) and the Equipment Identity Register (EIR).

The Authentication Center (AUC) is a maintained in a secure environment since it contains the network authentication algorithms. The network uses this database to obtain data that is used to "challenge" the mobile user when they make an access to the network. The AUC uses two algorithms known as A3 and A8, which are also stored in the Subscriber Identity Module (SIM) of the user. The A3 algorithm is used to authenticate the user by the familiar challenge response mechanism. The A8 algorithm is used to generate the required key for the radio interface encryption algorithm know as A5. Generally the A3 and A8 algorithms are developed by the network operators.

The Equipment Identity Register (EIR) contains a list of all the valid International Mobile Equipment Identity (IMEI) values. Using the unique IMEI value associated with all mobiles it is possible restrict the use of specific mobiles. This database is used to prevent the use of stolen or misbehaving mobile stations.

Operations and Maintenance

Associated with the BSS and NSS equipment are Operations and Maintenance Centers, OMC-R and OMC-S, respectively. The OMC-R and OMC-S provide the following standard operations and maintenance control functions for the GSM BSS and NSS:

Configuration Management
Fault management
Test Management
Performance Management
Security Management
Account Management Other functions may be available depending upon the BSS or NSS manufacturer. In addition the OMC-S may also be required to perform database or user management functions on the HLR and VLR.

Basic Services Provided by GSM

GSM was designed to be a feature rich mobile services with most services based upon ISDN principles. In basic terms the GSM provides a basic set of services which can be enhanced by the use of supplementary services. The Basic Services include:
  Speech, the most basic service
  Short Message, a two way messaging service
  Group 3 FAX, this services allows connection to Group 3 FAX machines
  Cell Broadcast, this service allows messages to be broadcast to the mobile stations.
The Bearer Services include:
  Asynchronous Data 300-14400 bps, allows access to normal V-Series Modems
  Synchronous Data 300-14400 bps, allows access to CSPDNs
  General Packet Radio Services 9600-170000 bps, a packet services allowing seamless access to the internet.
The following GSM supplementary services are currently available:
  Call Forwarding
  Call Barring Services
  Call Transfer
  Conference Calling
  Call Wait and Call Hold
  Calling Line Identification
  Call Completion to a Busy Subscriber Problems with Private/Public Cellular Networks Communicating MAP Via IP In wireless systems, it is often necessary to exchange MAP information between the private and public cellular networks. In the case of modem voice over IP (VoIP) H.323 and other IP based networks, it is not possible to communicate using the cellular protocols such as Mobile Application Part (MAP) or A-interface protocol via SS7. Conversely; neither is it possible for the public system to communicate using MAP or A-interface protocol with an H.323 or IP based network.

In accordance with the above background, it is the object of the present invention to provide wireless systems having the capability to exchange MAP interface information between IP and SS7 environments and between an IP network using an A-Interface.

SUMMARY OF THE INVENTION

The present invention is a communication system extending over a cellular region and formed of a plurality of wireless cells where each cell covers a portion of the cellular region. The communication system includes first and second wireless networks that use different protocols for communications in connection with mobile stations. The system includes a connection unit for interconnecting the first and second wireless networks and includes an interworking unit for protocol conversion between the different protocols.

The first wireless network, such as a public wireless network (PLMN), communicates with a first protocol, such as Signaling System #7 (SS7), for one or more first cells in the first wireless network. Each of the first cells includes a first base station for communicating with mobile stations in a first cell and a first control means using the first protocol for communications associated with the first base station. The second wireless network, such as a private wireless network, communicates with a second protocol, such as IP, for one or more second cells in the second wireless network. Each of the second cells includes a second base station for communicating with mobile stations in a second cell and a second control means using the second protocol for communications associated with the second base station.

The first and second wireless networks are connected through the connection unit that includes a gateway, such as a H.323 gateway, for coordinating communications between the different protocols used in the first and second wireless networks. The gateway or other parts of the connection unit may reside anywhere in the communication system such as on the premises of the private wireless network or on the premises of the PLMN cellular operator's site. The connection unit includes a cell router for routing calls among the base stations. The cell router is implemented in various embodiments using IP routers, Frame Relay and ATM switches.

The first and second wireless networks are coordinated by the interworking unit that translates commands in one protocol to those in another. Where the first and second wireless networks are PLMN and IP networks, the interworking unit includes, for example, an SS7 stack, an IP stack and a protocol converter for converting messages between IP messages and MAP messages, A-Interface messages or messages of other protocols.

The interworking unit may reside anywhere in the communication system such as on the premises of the private wireless network or on the premises of the PLMN cellular operator's site. The interworking unit is typically software executing on an suitable computing platform. The platform can use, for example, a Windows NT, a Unix or other operating system. In a typical configuration, communications internal to the private wireless network are via H.323 and communications with a public wireless network (PLMN) to an MSC and/or HLR are via a SS7 based link.

The present invention is useful in a communication system formed by a private network that includes a private wireless network based on IP. The communication system is also useful in public wireless networks using public wireless protocols, such as GSM; TDMA, or CDMA. These public systems typically connect to other public networks, such as PSTN, ISDN and the Internet using a wired protocol, such as IP, ATM or Frame Relay. The private network also typically includes a local area network (LAN) and the private network typically connects to the public networks using a wired packet protocol, such as IP.

In connection with some embodiments, the public and private wireless networks operate with the same public wireless protocol, such as GSM, TDMA or CDMA, and the private wireless network additionally operates with a wired packet protocol, such as IP.

The private wireless network uses private base stations (P-BTS) which include software for a wireless protocol, such as GSM, TDMA or CDMA, including software for private network operation with a wired protocol, such as IP.

FIG. 9 depicts the call flaws of a public user in the private network.

FIG. 10 depicts the call flaws of a private user in the public network.

DETAILED DESCRIPTION OF THE DRAWINGS

Figure 1:
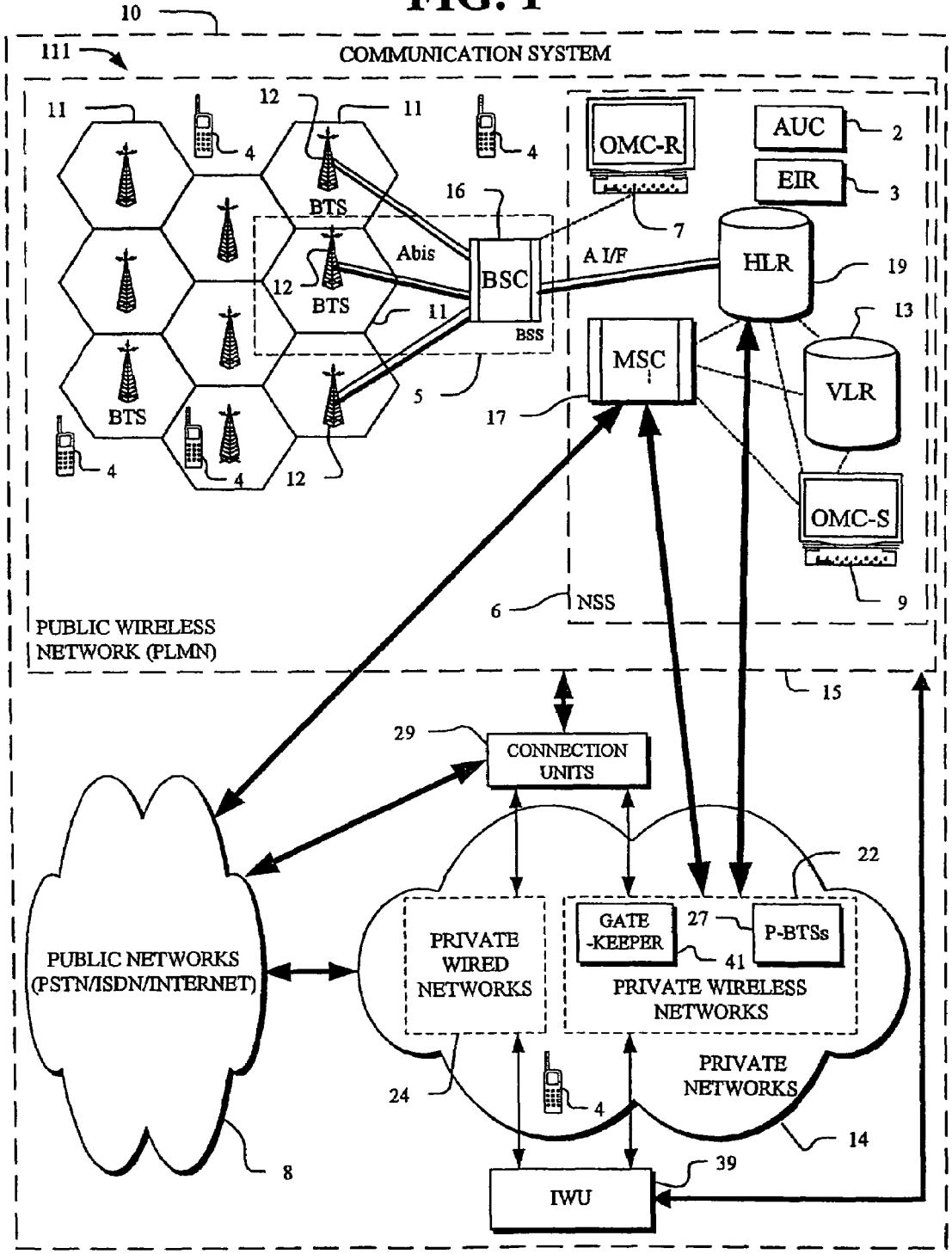
Figure 2:
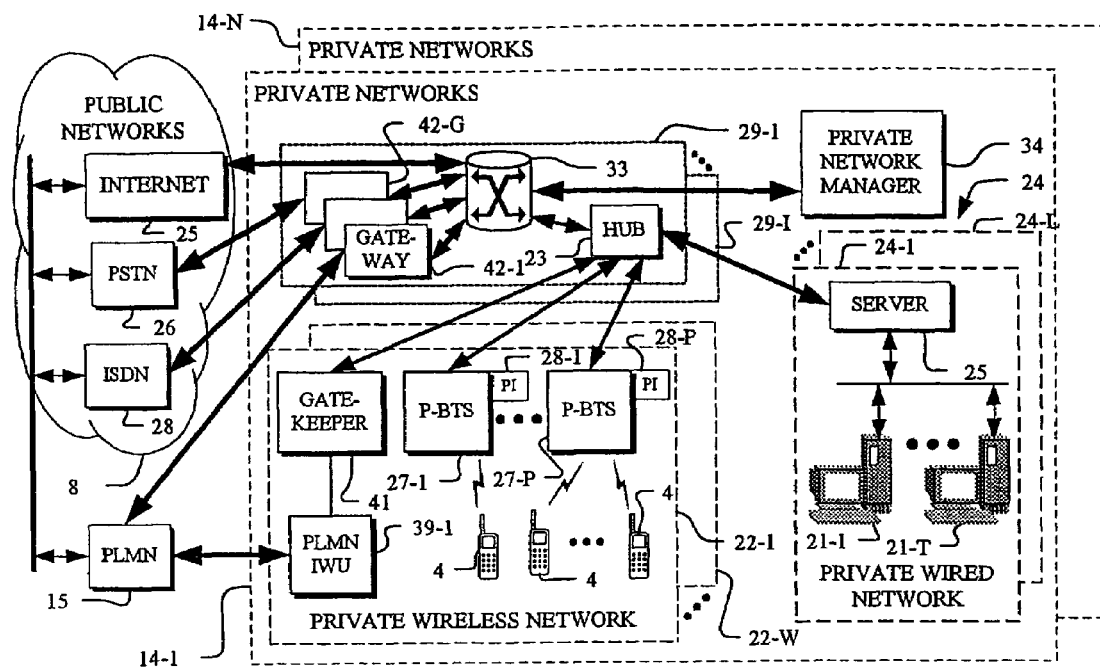

Communication System—FIG. 1 and FIG. 2.

In FIG. 1, the communication system 10 includes a public wireless network 15, public networks 8 (such as PSTN, ISDN and the Internet) and private networks 14. The public wireless network 15 includes the ability to communicate, in a conventional manner, with conventional wireless mobile stations 4. The private networks 14 function to communicate with the conventional mobile stations 4 and provide additional private network capabilities not provided by the public wireless network 15.

The public wireless network 15 of FIG. 1, sometimes called the public land mobile network (PLMN), includes the mobile stations (MS) 4, Base Station Sub-System (BSS) 5 and the Network Sub-System (NSS) 6. The Base Station Subsystem (BSS) 5 is composed of the Base Transceiver Stations (BTSs) 12 and the Base Station Controller (BSC) 16. Each of the BTSs 12 includes a radio transceiver that defines the radio boundary of a cell 11 and handles the radio (Um) interface protocols with the mobile stations 4.

The cells 11 in the wireless public network 15 of FIG. 1 each exist aver a different area and together the cells 11 collectively exist aver a larger area designated as a region 111. Each cell 11 in the region 111 uses frequencies are rather properties that are isolated from the frequencies are rather properties of rather cells in the region. When mobile stations 4 travel from one of the cells 11 to another one of the cells 11, a hand-aver occurs.

The private networks 14 of FIG. 1 include private base stations (P-BTSs) 27 within the private wireless networks 22 for communications with mobile stations 4 located within the domain of the private networks 14. The private base stations (P-BTSs) 27 function in private regions farmed of private cells (see private cells 411 of FIG. 4) within the domain of the private networks 14 of FIG. 1. The private cells 411 typically cover a portion of the area covered by one or more of the cells 11 of the public wireless network 15 of FIG. 1. Typically, the allocation of frequency spectrum in different public and private regions is under governmental central and frequency spectrum is allocated to different entities in different regions and different countries. The owner of the rights to particular frequencies in a region, including regions for public wireless network 15 and private wireless networks 22, controls the allocation of frequencies among public cells 11 of FIG. 1 and the private cells 411 (see FIG. 4).

The Base Station Controller (BSC) 16 manages the radio resources of one or more BTSs 12 across an Abis interface. The BSC 16 controls the radio network, including allocation of radio time slots and frequencies to mobile stations 4, release of resources, interpretation of measurement results and control of radio interface hand-overs. The BSC 16 interfaces to the NSS 6 via an A-interface to MSC 17. The Network Subsystem (NSS) 6 includes the Mobile services Switching Center (MSC) 17 that provides, in a conventional system, the functions required to switch calls to/from the mobile stations 4 and the fixed public networks 8 (including PSTN and ISDN). In addition, the MSC 17 also provides the functions needed to track and maintain communication with mobile stations 4 and these functions include registration, authentication, location updating, MSC hand-overs, and call routing to roaming mobile stations 4. The GSM/TDMA/CDMA cellular system employs a Home Location Register (HLR) 19 and a Visitor Location Register (VLR) 13, an Authentication Center (AUC) secure database 2 and an Equipment Identity Register (EIR) 3. The Operations and Maintenance Center includes the OMC-R 7 and the OMC-S 9.

In FIG. 1, private networks 14 include the private wireless networks 22 (including private wireless networks 22-1, . . . , 22-W as shown in FIG. 2), private wired networks 24, including local area networks (LANs, 24-1, . . . , 24-L, as shown in FIG. 2), and connection units 29 (including connection units 29-1, . . . , 29-I as shown in FIG. 2). The private networks 14 can include wide area networks (WAN) and any other type of network presently or hereafter available. As shown in FIG. 2, the connection units 29 of FIG. 1 include, in one embodiment, hubs 23 for interconnecting the private wireless networks 22 and the LANs 24 and for connecting the private networks 14 to the public networks 8. As shown in FIG. 2, a typical hub 23 connects to a router 33 that directs calls among the public network facilities including the ISDN 28, the PSTN 26, the Internet 25 and the private networks 14. The private networks 14 use the same protocol as the Internet 25 and connects directly without need for a separate gateway. The connection units 29 include, as shown in FIG. 2, gateways 42-1, 42-2, . . . , 42-G for connecting the ISDN 28 and the PSTN 26 which use different protocols than the private networks 14.

In FIG. 1, the private wireless networks 22 include the wireless capabilities of the public wireless network 15 of FIG. 1. In addition, the private wireless networks 14 are suitable for operating with advanced technologies that are not generally available publicly. Current advanced technologies operate with rates of 384 kb/s and are approaching rates of 2 Mb/s for W-CDMA. In FIG. 1, wireless communications between the public BTSs 12 and mobile stations 4 operate with a wireless protocol such as GSM/TDMA/CDMA. In FIG. 1, wireless communications between the private P-BTSs 27 and mobile stations 4 for convenience and compatibility operate with the same wireless protocol (such as GSM/TDMA/CDMA) as used by the public BTSs 12 in the public wireless network 15.

In FIG. 1, the private wired networks 24 are typically local area networks (LANs) operating with a wired packet protocol such as IP.

The private wireless networks 22 in FIG. 1 do not require the internal support of a circuit switch from the public networks and therefore, the private networks 14 in the FIG. 1 system can easily expand to accommodate new user requirements under control of the owners of the private networks 14.

In the private networks 14 of FIG. 1, the mobile stations 4 are typically unmodified, conventional wireless mobile station handsets like those widely used in conventional public wireless networks and therefore the mobile stations 4 can freely move between the public wireless network 15 of FIG. 1 and the private wireless networks 22 of FIG. 1 without restriction. Because of this free movement capability, only a single number is required for each mobile station 4 for both private wireless network communications and for public wireless network communications.

The private wireless networks 22 of FIG. 1 have P-BTSs 27 with corresponding private cells (P cells) 411 (see FIG. 4) in the private wireless domain. The public wireless network 15 of FIG. 1 has BTSs 12 with corresponding public cells 11 in the public wireless domain. The allocation of frequencies among the public wireless network cells and the private network cells is determined by agreement of the owners of the public wireless network 15 and the private networks 14.

The private wireless networks 22 of FIG. 1 each have an interworking unit (IWU) 39 that facilitates the inter working of different protocols that coact in processing calls from one wireless network to another. The private wireless networks 22 of FIG. 1 have gatekeepers 41 that function to correlate addresses that are for the same mobile stations but which are presented in different protocols.

Interconnected Public Wireless Network and Private Wireless Network—FIG. 2

In FIG. 2, private networks 14 include private networks 14-1, . . . , 14-N. Private network 14-1 is typical and includes the private wireless networks 22 (including private wireless networks 22-1, . . . , 22-W), local area networks (LANs) 24 (including LANs 24-1, . . . , 24-L), and connection units 29 (including connection units 29-1, . . . , 29-I). The private networks 14 can include wide area networks (WAN) and any other type of network presently or hereafter available. The connection unit 29 includes a hub 23 for interconnecting the private wireless networks 22 and the LANs 24 and for connecting the private network 14-1 to the public networks 8. The hub 23 connects to the router 33 that directs calls among the public network facilities including the ISDN 28, . . . , PSTN 26 and the Internet 24 and the private networks 14. The private networks 14 use the same protocol as the Internet 25 and connect directly-without need for a separate gateway. The connection unit 29 includes gateways 42-1, . . . , 42-G for connecting the ISDN 28, . . . , PSTN 26 which use different protocols than the private networks 14.

In FIG. 2, the private wireless networks 22 include the wireless capabilities of the public wireless network 15 of FIG. 1. In FIG. 2, wireless communications between the private P-BTSs 27 and mobile stations 4 for convenience and comparability operate with the same wireless protocol (such as GSM) as used by the public BTSs 12 in the public wireless network 15.

In FIG. 2, the local area networks (LANs) 24 are private wired networks operating with a wired packet protocol such as IP. LAN 24-1 is typical and includes, for example, a server 25 and LAN terminals 21 (including terminals 21-1, . . . , 21-T). Terminals 21-1, . . . , 21-T communicate with each other and with the public networks 8 through connection unit 29 using the wired packet protocol.

In FIG. 2, the P-BTSs 27-1, . . . , 27-P are associated with protocol converters 28-1, . . . , 28-P, respectively, that connect P-BTSs 27-1, . . . , 27-P to connection unit 23 using the private network protocol used by the LANs 24 and the router 23. Therefore, the mobile stations 4 communicating through the P-BTSs 27 in the private networks 14 have access to the terminals 21 in LANs 24 and have access to the public networks 8.

In FIG. 2, the wireless P-BTS 27 directly connect the mobile stations 4 through router 33 to other facilities in private networks 14 and thereby permit, for example, the mobile stations 4 to send and receive calls to and from the terminals 21 in the LAN networks 24. Furthermore, the range of calls from and to mobile stations 4 in the private wireless network 22, using standard Internet protocols (IP), extends over the Internet in public networks 8 to any Internet facility such as different LANs and different corporations in different regions or countries.

The private wireless networks 22 in FIG. 2 do not require the internal support of a circuit switch (for example, an MSC) from the public networks and therefore, the private networks 14 in the FIG. 2 system can easily grow to accommodate new user requirements under control of the owners of the private networks 14.

In the private networks 14 of FIG. 2, the mobile stations 4 are typically unmodified, conventional wireless mobile station handsets like those widely used in conventional public wireless networks and therefore the mobile stations 4 can freely move between the public wireless network 15 of FIG. 1 and the private wireless networks 22 of FIG. 2 without restriction. Because of this free movement capability, only a single number is required for each mobile station 4 for both private wireless network communications and for public wireless network communications.

Figure 4:
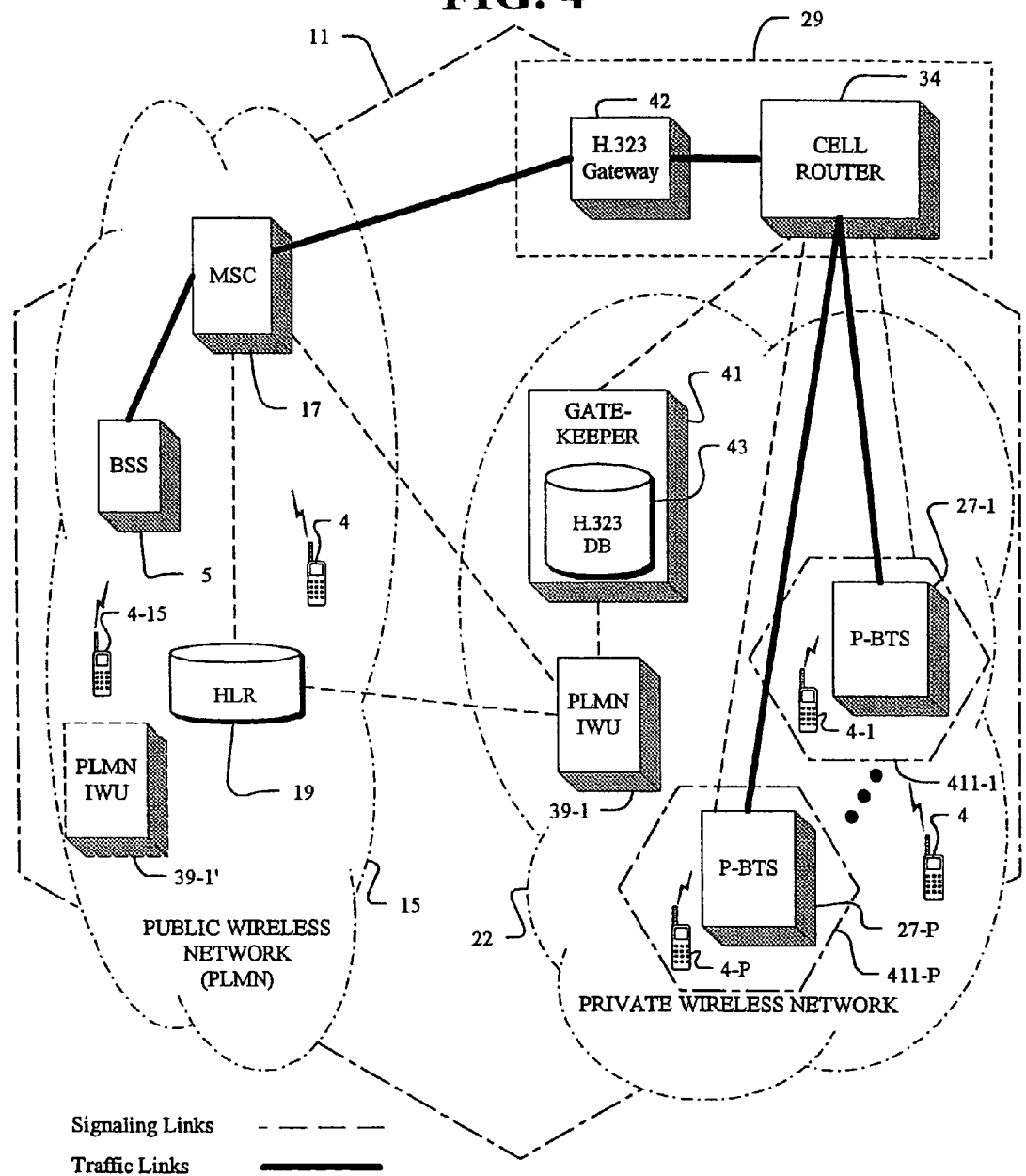

The private wireless networks 22 of FIG. 2 have P-BTSs 27-1, . . . , 27-P which operate in the private cells 411 (See FIG. 4). The allocation of frequencies among the public wireless network cells 11 and the private network cells 411 is determined by agreement of the owners of the public wireless network 15 and the private networks 14.

In order to allow users to roam freely between the public wireless network 15 and private wireless networks 22, a PLMN interworking unit (PLMN IWU) 39-1 is provided. The PLMN IWU 39-1 connects to the Private Wireless Networks, Gatekeeper 41 and the PLMN 15. The PLMN IWU 39-1 can be connected to the H.323 Gatekeeper database 43 by a number of means, however in this example, the IWU is connected via an IP link. The PLMN IWU 39-1 is connected to the PLMN via a Signaling System 7 (SS7) link that is running Message Transfer Part (MTP), Signaling Connection Control Part (SCCP), Transactions Control Application Part (TCAP) and the Mobile Application Part (MAP). The PLMN IWU 39-1 converts between the signaling protocols found in the Private Network 22-1 which are based upon IP and the PLMN which is based up SS7.

In FIG. 2, the gatekeeper 41 includes a local database (see data base 43 in FIG. 4) which communicates via IP providing local user authentication, a local client for communicating with a remote protocol gateway (gateway 42 provides remote IP-to-SS7 conversion) through cell router 34, and a local interface module which communicates over IP to the PLMN IWU 39-1.

Figure 3:
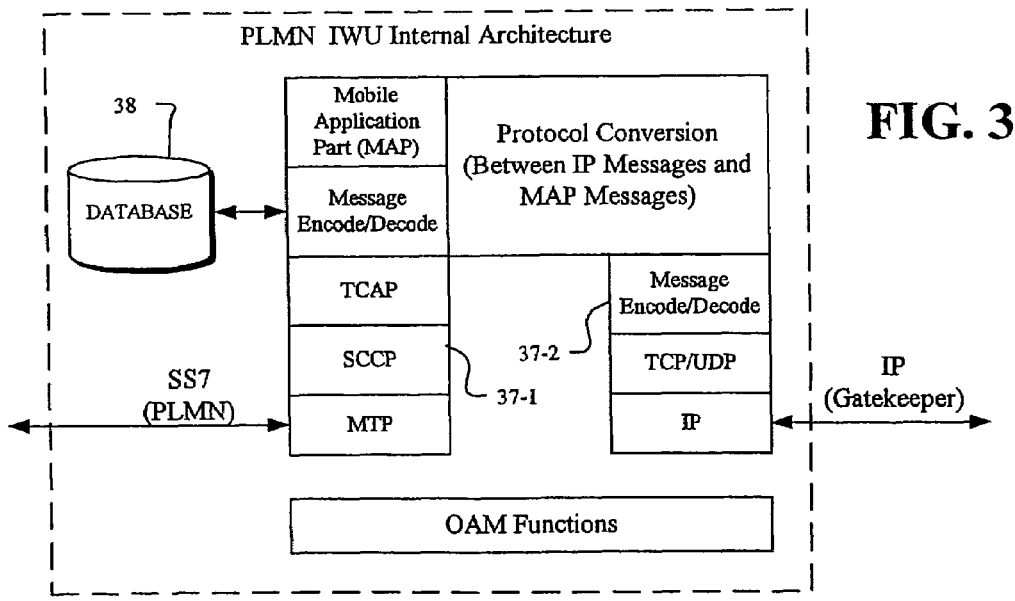

Public Land Mobile Network Interworking Unit—FIG. 3

FIG. 3 shows the internal architecture of the interworking: unit (IWU) 39 when the IWU is a Public Land Mobile Network Interworking Unit (PLMN IWU) which provides a link between the domain of the private wireless network 22 and the domain of the public wireless network (PLMN) 15. In a preferred embodiment, the signaling for the private wireless network 22 operates in the IP domain and signaling for the public wireless network 15 operates in the SS7 domain. In such an embodiment, the PLMN IWU 39-1 contains two independent software stacks 37-1 and 37-2, one for the private IP domain and one for the public SS7 domain.

The first stack 37-1 is used to interface with the SS7 network and includes standard MTP, SCCP and TCAP layers. On top of these layers is a Message Encoder/Decoder layer which is responsible for receiving and dispatching of messages from/to the SS7 network. This layer functions to take the messages generated by the Mobile Application Part and correctly format them for use by the lower layers of the first stack 37-1. The Mobile Application Part is a standard stack layer as defined for GSM, TMDA and CDMA cellular systems.

The second stack 37-2 is used to interface with the IP network and includes standard IP and TCP/UDP layers. On top of these layers is a Message Encoder/Decoder layer which is responsible for the receiving and dispatching of messages from/to the IP network. This layer functions to take the messages generated by the Protocol Conversion layer and correctly format them for use by the lower layers of the second stack.

The main functionality of the PLMN IWU 39-1 is contained in the Protocol Conversion layer. The Protocol Conversion layer functions within the PLMN IWU 39-1 to process commands (called pseudo-MAP messages in the description below) sent by the IP network (originating from the H.323 database 43) and converting them to MAP messages that can be recognized by the public wireless network 15. In the embodiment described, the particular messages are based upon the H.323 suite of protocols, however other VoIP protocols, such as SIP, can be similarly implemented in the IP-MAP Protocol Conversion layer. The operation of the Protocol Conversion layer is algorithmically predetermined with a mapping between all the H.323 messages and their MAP counterparts. When a pseudo-MAP message of for example, type A arrives from the H.323 IP side of the unit it is converted into a MAP message type B for sending out on the public wireless network 15 SS7 side. Similarly if a message of type B arrives on the public wireless network 15 SS7 side it will be converted to type A on the H.323 IP side of the unit.

In order to correctly address the messages between the SS7 entities and IP entities, a database 38 is provided that maps SS7 point codes or E.164 numbers to their corresponding IP addresses. Using this scheme, all messages reach their correct recipients. The database 38 in one embodiment is statically set via the operations and maintenance interface and in another embodiment is dynamically built as new addresses are received.

The OAM Functions maintain the operation of the PLMN IWU 39-1. The OAM Functions are responsible for administering the database 38 and all the addresses that are needed in the communication system. The OAM Functions are also responsible for correctly assigning SS7 and IP address to the PLMN IWU 39-1 itself so that it may appear in both the IP and SS7 domains.

In the embodiment described, the PLMN IWU 39-1 software functions are located in one common entity. However, in other embodiments, the PLMN IWU 39-1 software functions are split into two or more separate entities that are in the same or in different locations in the communication system. For example, the Protocol Conversion function for converting between IP and MAP messages can be performed in one entity, such as the H.323 database 43, and the sending of MAP messages on the SS7 network can be performed in another entity.

Signaling Links and Traffic Links Between Private and Public Wireless Networks—FIG. 4

FIG. 4 provides a detailed view of a private wireless network 22, having a PLMN IWU 39, interconnected between the public wireless network (PLMN) 15 and private wireless network 22. The private wireless network 22 includes a plurality of P-BTS 27, including P-BTS 27-1, . . . , 27-P, each associated with a corresponding private cell 411, including the private cells 411-1, . . . , 411-P, respectively. The public wireless network 15 includes an MSC 17 and a BSS 5 associated with the public cell 11. The public cell 11 typically covers a larger area than the private cells 411 and typically the private cells 411 are within the operating region of the public cell 11. Each of the public and private cells include mobile stations 4, for example, mobile station 4-1 is typical of the mobile stations serviced by P-BTS 27-1 in the private wireless network 22 and mobile station 4-P is typical of the mobile stations serviced by P-BTS 27-P in the private wireless network 22. The mobile station 4-15 is typical of the mobile stations serviced by BSS 5 in the public wireless network 15.

In FIG. 4, the PLMN IWU 39-1 is interconnected to the public HLR 19 and MSC 17 of the public wireless network (PLMN) 15 via signaling links (shown as broken lines in FIG. 4). In the embodiment described, these signaling links use the SS7 protocol. The PLMN IWU 39-1 also connects to the gatekeeper 41 that includes the H.323 database 43 via a signaling link that uses the IP protocol. In the embodiment described, the PLMN IWU 39-1 connection to the gatekeeper 41 only carries signaling information, however, in other embodiments, it may carry voice or other related signaling traffic.

While the PLMN IWU 39-1 has been shown as a single entity located in the private wireless network 22, the PLMN IWU 39-1 can also be located in the public wireless network 15 (shown with broken lines as 39-1') as a single entity or can be distributed in parts at various different locations. The links between the PLMN IWU 39-1 and other components are implemented as a function of where the PLMN IWU 39-1 or its parts are located. In FIG. 4, the PLMN IWU 39-1 is located as a single entity in the private wireless network 22 and the links from the PLMN IWU 39-1 with the MSC 17 and HLR 19 exist in different forms. In one form, the links are leased lines or other direct connections. In another embodiment, the connections between the PLMN IWU 39-1 and the PLMN 15 are indirect through, for example, the cell router 34.

In FIG. 4, the public wireless network (PLMN) 15 includes the gatekeeper 41 that connects to a connection unit 29. The connection unit 29 includes means for interconnecting a mobile station 4, for example, mobile station 4-1 serviced by P-BTS 27-1 in the private wireless networks 22 to another mobile station 4, for example, mobile station 4-P serviced by P-BTS 27-P in the private wireless network 22. Also, the connection unit 29 includes means for interconnecting a mobile station 4, for example, mobile station 4-1 serviced by P-BTS 27-1 in the private wireless networks 22 to another mobile station 4, for example, mobile station 41-15 serviced by the BSS 5 in the public wireless network 15. When such connections involve different signaling protocols, each of the protocols are abstracted to the protocol (for example, H.323) database 43.

The connection unit 29 can use any convenient switching or routing apparatus for directing calls from one mobile station to another. For example, in one embodiment described, the cell router 34 in connection unit 29 is an IP router that uses IP addresses for routing calls among the P_BTSs 27 or for routing calls through H.323 gateway 42 to the public wireless network 15. In another example, the cell router 34 includes an ATM or other switch that switches calls among mobile stations 4 located in any of the cells including public cell 11 and private cells 411-1, . . . , 411-P.

The gatekeeper 41 enables protocol independent cell routing using cell router 34 with information from address correlation database 43. Gatekeeper 41 includes a lookup table which correlates identifiers in different protocols. The different protocols include, for example, IP addresses, MSRN numbers, and virtual circuit identifiers (VCI). The correlation performed in gatekeeper 41 using database 43 enables any embodiment of cell router 34 to correlate identifiers from different protocols. By way of example, the router 34 in different embodiments is implemented as an IP router, a frame relay switch, or an ATM switch. In each of these embodiments, cell router 34 functions to switch and/or route mobile traffic to and from mobile stations 4.

The switching role of a conventional MSC 17, such as shown in FIG. 1, is fulfilled by packet or cell routing hardware included within cell router 34. In operation, for example, when a mobile station 4 in FIG. 4 requests a path through the network, the gatekeeper 41 maps an MSRN number to an appropriate IP address in the case of an IP router. In operation, for another example, when a mobile station 4 in FIG. 4 requests a path through the network, the gatekeeper 41 maps a VCI address to an appropriate IP address in the case of an ATM switch and further the gatekeeper 41 maps an MSRN number to the appropriate IP address. Similar mappings are effected for any IP, frame, ATM switch or other routing or switching mechanism. The IP, MSRN, VCI or other identifier mapping occurs in the gatekeeper 41 and hence operation is independent of any particular embodiment of router 34. Also, the particular routing mechanism employed for switching calls among cells is external to the private wireless network 22. The private wireless network 22 is able to operate with any protocol that may exist or may be defined.

Operation

The operation of the PLMN IWU 39-1 and the communication system 10 of FIG. 1 are described in connection with four call flows presented in FIG. 5, FIG. 6, FIG. 7 and FIG. 8 for a system in which the public wireless network 15 operates in the SS7 domain and the private wireless network 22 operates in the IP domain. In each of those figures, the operation inside the double-boarded box represents the functionality of the IP/SS7 Protocol Conversions for signaling.

Figure 5:
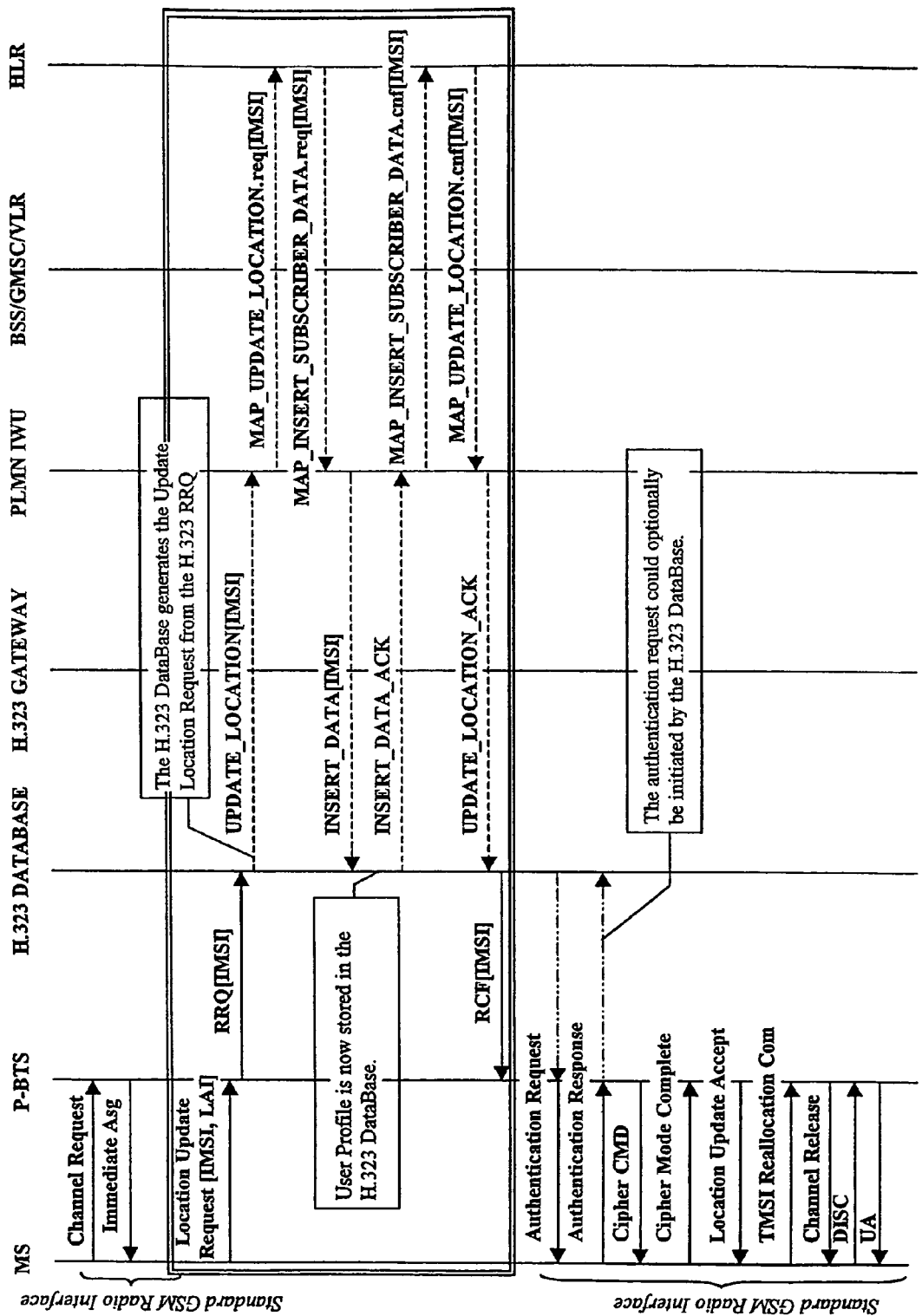

Location Update Procedures for a Public User on the Private Network—FIG. 5.

In FIG. 5, the signaling flows that are used to register the Public User on the Private Network are presented.

In the first part of the call flow, the Public Users Mobile Station (MS) accesses the P-BTS using the standard Channel Request/Immediate Assignment signaling messages. This is followed by the Location Update Request message containing the IMSI and LAI from the Mobile Station. Upon receiving this message, the P-BTS then sends an H.323 Registration Request (RRQ) to the H.323 database 43. The RRQ contains the IMSI information for the Mobile Station. The H.323 database 43 then translates this information into the correct psuedo-MAP message, in this case an UPDATE_LOCATION which contains the IMSI of the Mobile Station and the originating IP address of the H.323 database 43. When the message arrives at the PLMN IWU 39-1, using IP, it is translated further into a complete MAP message, in this case MAP_UPDATE_LOCATION, and the SS7 point code or E.164 number of the Public Users HLR 19 is derived from the IMSI and appended to the message. The complete message can now be passed to the SS7 network and sent to the Public Users HLR 19. At the same time a new TCAP transaction is opened and associated with the IP address and transaction identity of the H.323 database 43, as well as the SS7 address of the HLR 19. Upon receipt of this message, the HLR 19 will perform the standard operations to verify the users identity. If successful, the HLR 19 will then return the MAP_INSERT_SUBSCRIBER_DATA request which contains not only the mobile subscribers IMSI but also the complete subscriber database contents for that user. In addition, the message will also contain the SS7 address of the HLR 19 so that the authenticity of the message can be verified by the H.323 database 43 upon receipt.

When the H.323 PLMN IWU 39-1 receives the MAP_INSERT_SUBSCRIBER_DATA request, it first checks that the SS7 address is valid, if this passes then the message is translated into the IP format as INSERT_DATA. Using the transaction identity stored when sending the first MAP_UPDATE_LOCATION message, the PLMN IWU 39-1, is able to determine the destination for the message. When the H.323 database 43 receives the INSERT_DATA message, the data contained in the message is stored in its local database for use in future processing. If all the information is correct, the H.323 database 43 now acknowledges the data using the INSERT_DATA_ACK message. This information is again translated by the PLMN IWU 39-1 into the appropriate MAP message, in this case INSERT_DATA_ACK, and sent to the HLR 19. If the acknowledgement is acceptable to the HLR

19, it then sends a MAP_UPDATE_LOCATION confirm to the PLMN IWU 39-1. The PLMN IWU 39-1, upon receipt of this message, reformats the contents into UPDATE_LOCATION_ACK and sends the message to the H.323 database 43. At this point, the transaction information related to the signaling between the H.323 database 43 and the HLR 19 can be removed as it is no longer required.

Upon receipt of the UPDATE_LOCATION_ACK message, the H.323 database 43 sends a Registration Confirm (RCF) message to the P-BTS on the private network. Receipt of the RCF triggers a series of standard radio interface messages which include Authentication of the Mobile User, Ciphering of the radio link should it be needed. This operation may lead to reallocation of the TMSI if required by the network operator. At the end of this process, the radio resources are released using the standard Channel Release, Disconnect and UA message sequence.

Figure 6:
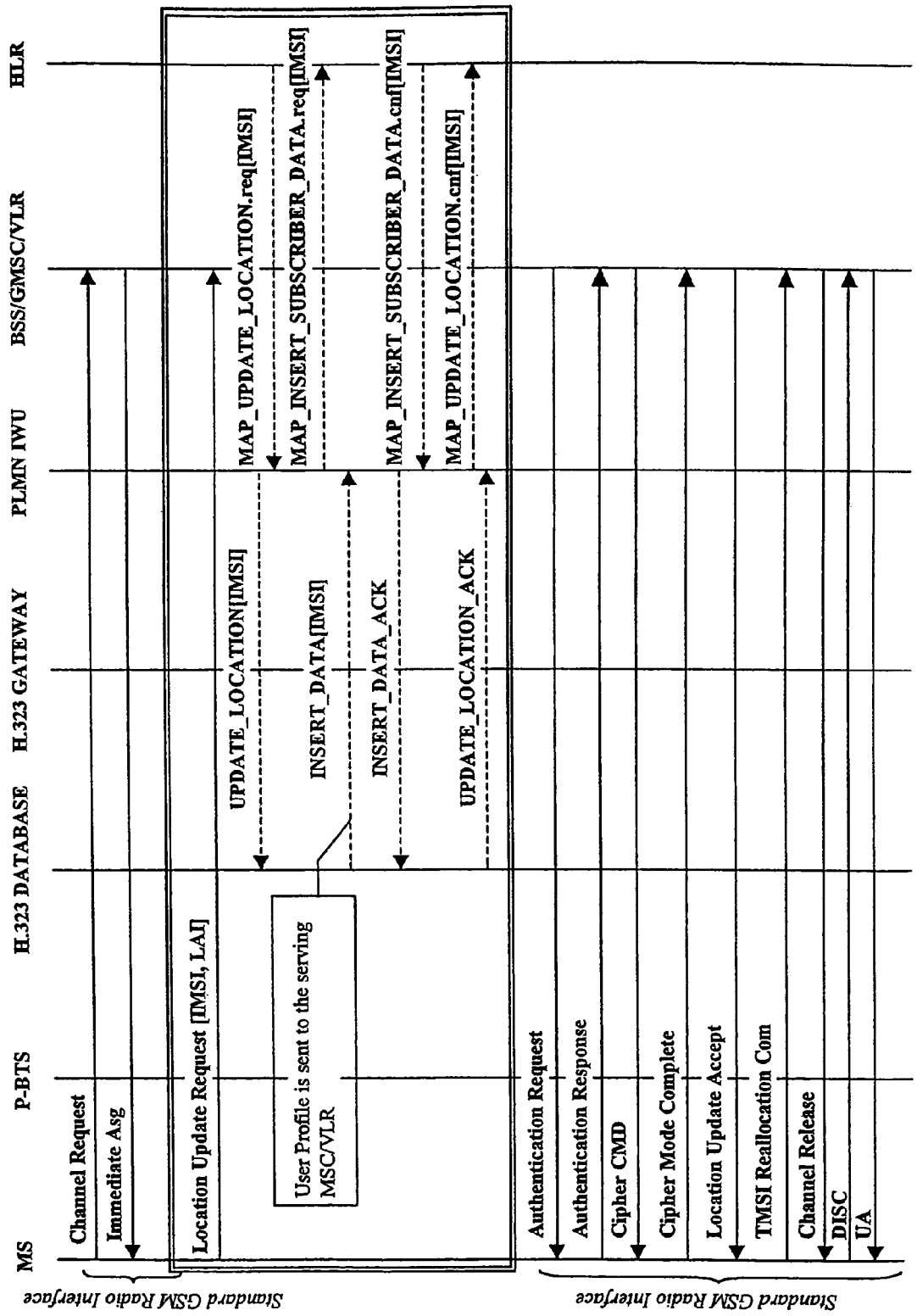

Location Update Procedures for a Private User on the Public Network—FIG. 6.

In FIG. 6 the signaling flows that are used to register the Private User on the Public Network are presented.

In the first part of the call flow, the Private Users Mobile Station (MS) accesses the public networks BSS/GMSC/VLR, generally using the standard Channel Request/Immediate Assignment signaling messages, these are not shown here. Upon receipt of the Location Update Request from the MS, containing the IMSI, the public network can determine that this is a private user location update request, consequently all the message links for this user are now directed to the PLMN IWU 39-1 serving this private user. The public network continues the location update process by sending a MAP_UPDATE_LOCATION request to the PLMN IWU 39-1 containing the IMSI of the private user. The PLMN IWU 39-1 then translates this into the correct pseudo-MAP message, in this case a UPDATE_LOCATION which contains the IMSI of the Private Mobile. The PLMN IWU 39-1 also stores the SS7 address and transaction identity of the originating entity in the public network for future reference. The UPDATE_LOCATION message is then forwarded onto the correct H.323 database 43. The PLMN IWU 39-1 determines the correct H.323 database 43 by using its internal database which maps the incoming IMSI onto the IP address of the H.323 database 43.

When the UPDATE_LOCATION message arrives at the H.323 database 43, it is checked for consistency. In addition checks are made to determine if the private subscriber is allowed to roam to the public network. If the private mobile user is not allowed to roam, then the response to the message would be negative (not shown) and the dialogue would be terminated. However, if the user is allowed to roam, then the H.323 database 43 responds with the pseudo-MAP message INSERT_DATA to the PLMN IWU 39-1 serving the public network. The correct PLMN IWU 39-1 is determined by using the source IP address provided when the UPDATE_LOCATION message was received. The INSERT_DATA message contains all the subscriber database information required by the public network.

When the PLMN IWU 39-1 receives the INSERT_DATA message, it is translated into the correct MAP message, in this case a MAP_INSERT_SUBSCRIBER_DATA request, and sent to the originating SS7 node using the SS7 address supplied in the original MAP_UPDATE_LOCATION request. If the SS7 receiving entity accepts the message from the private network then the MAP_INSERT_SUBSCRIBER_DATA confirmation is returned to the PLMN IWU 39-1. This message is then translated into the pseudo-MAP_INSERT_SUBSCRIBER_DATA message and sent to the H.323 database 43 supporting the user. If the response is accepted by the H.323 database 43, then the UPDATE_LOCATION_ACK is sent to the PLMN IWU 39-1. The PLMN IWU 39-1 will then translate this to the required MAP_UPDATE_LOCATION confirm message. At this point, the transaction information related the signaling between the H.323 database 43 and the HLR 19 can be removed as it is no longer required.

Upon receiving the MAP_UPDATE_LOCATION confirm message, the public network may start a series of standard radio interface messages which include Authentication of the Mobile User, Ciphering of the radio link should it be needed. This operation may lead to reallocation of the TMSI if required by the network operator. At the end of this process, the radio resources are released using the standard Channel Release, Disconnect and VA message sequence.

Figure 7:
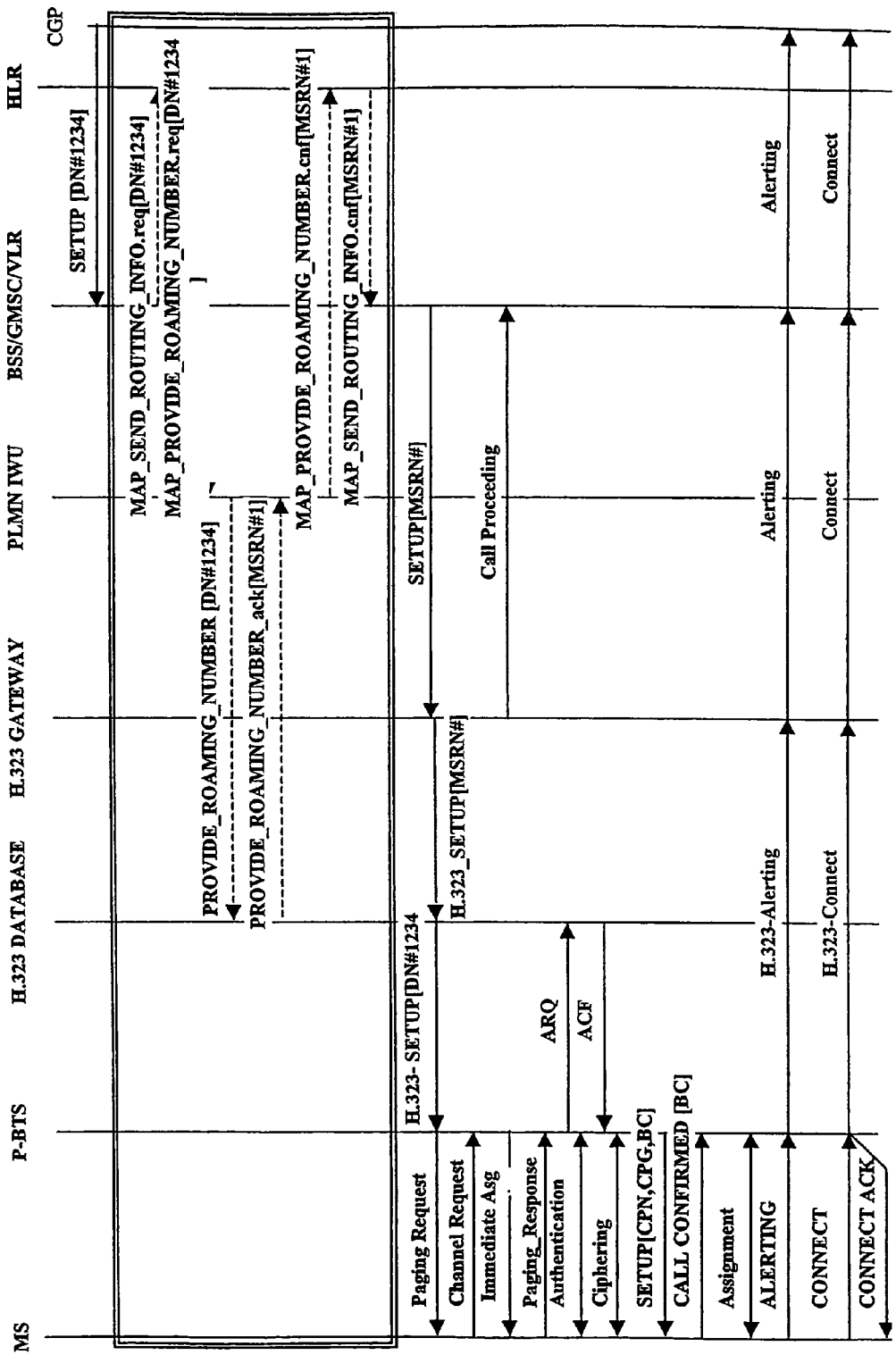

Mobile Terminated Call (MTC) to a Public User in the Private Network—FIG. 7.

In FIG. 7 the signaling flows that are used to contact a Public User that is located on the Private Network are presented.

In the first part of the call flow, a SETUP message is received by the Gateway MSC (GMSC) in the public network from the Calling Part (CGP). The SETUP message contains the Dialed Number (DN) of the user, in this case 1234. The GMSC will now try to locate the called user, in order to do this the standard MAP message MAP_SEND_ROUTING_INFO request containing the dialed number is sent to the Public Network HLR 19. The Public:HLR 19 then uses the previous location update information (see cases above) to locate the user. In this case, the user is located on the Private Network and the request (MAP_PROVIDE_ROAMING_NUMBER) for a roaming number is sent to the PLMN IWU 39-1 serving the Private Network. The PLMN receipt of IWU 39-1 the upon MAP_PROVIDE_ROAMING_NUMBER message uses the destination address contained in the message to determine the location of the H.323 database 43 serving the public user. Once the destination has been found, the message is translated into the pseudo-MAP message, PROVIDE_ROAMING_NUMBER request, for dispatch to the serving H.323 database 43. Upon receipt of the PROVIDE_ROAMING_NUMBER message, the H.323 database 43 checks whether or not this user is registered in the database. If the user is not registered, then the message is rejected (not shown). If the user is present, then the H.323 database 43 selects a Mobile Station Roaming Number (MSRN) from the allocated pool, it then also associates the selected MSRN with the IMSI of the user in its internal database. The H.323 database 43 can now format a pseudo-MAP response message, PROVIDE_ROAMING_NUMBER ack, containing the MSRN that can be sent back to the PLMN IWU 39-1.

When the PLMN IWU 39-1 receives the PROVIDE_ROAMING_NUMBER ack from the H.323 database 43, it formats the message into the MAP_PROVIDE_ROAMING_NUMBER confirmation message to be sent to the public HLR. 19. This message will contain the MSRN provided by the H.323 database 43 as well as the correct destination address and transaction identity. When the Public HLR 1 receives this message, it sends the MSRN to the requesting GMSC using the standard MAP_SEND_ROUTING_INFO confirmation message. The GMSC then uses the MSRN to route the call to the H.323 gateway serving the Private Network, this is shown by the SETUP[MSRN#1] message.

When the H.323 Gateway receives the SETUP message with the allocated MSRN, it sends the H.323_SETUP message with the MSRN#1 to the H.323 database 43 and sends a Call Proceeding message to the public network. The H.323 database 43 can then determine which Public Mobile user is being called by using the MSRN-IMSI association established in the earlier part of the dialogue. Once the final destination has been determined by the H.323 database 43 using the MSRN-IMSI-IP address mapping, the call can be further routed to the P-BTS using an H.323_SETUP message containing the original dialed digits.

When the P-BTS receives the H.323_SETUP message, it will begin the standard cellular mobile terminated call procedures with an initial Paging Request. The Mobile Station then responds to the Paging Request and the radio link can be established, this may include H.323 Access Request (ARQ) and Access Confirmation (ACF). Once the correctly ciphered link has been established, the P-BTS can then send the SETUP message to the mobile. The mobile responds with the Call Confirmed message. The network can then assign the radio resources and generate the Alerting message for the public network. If the public user is available, the mobile can be answered, which generates the Connect/Connect Ack message sequence as well as the Connect into the public network.

Figure 8:
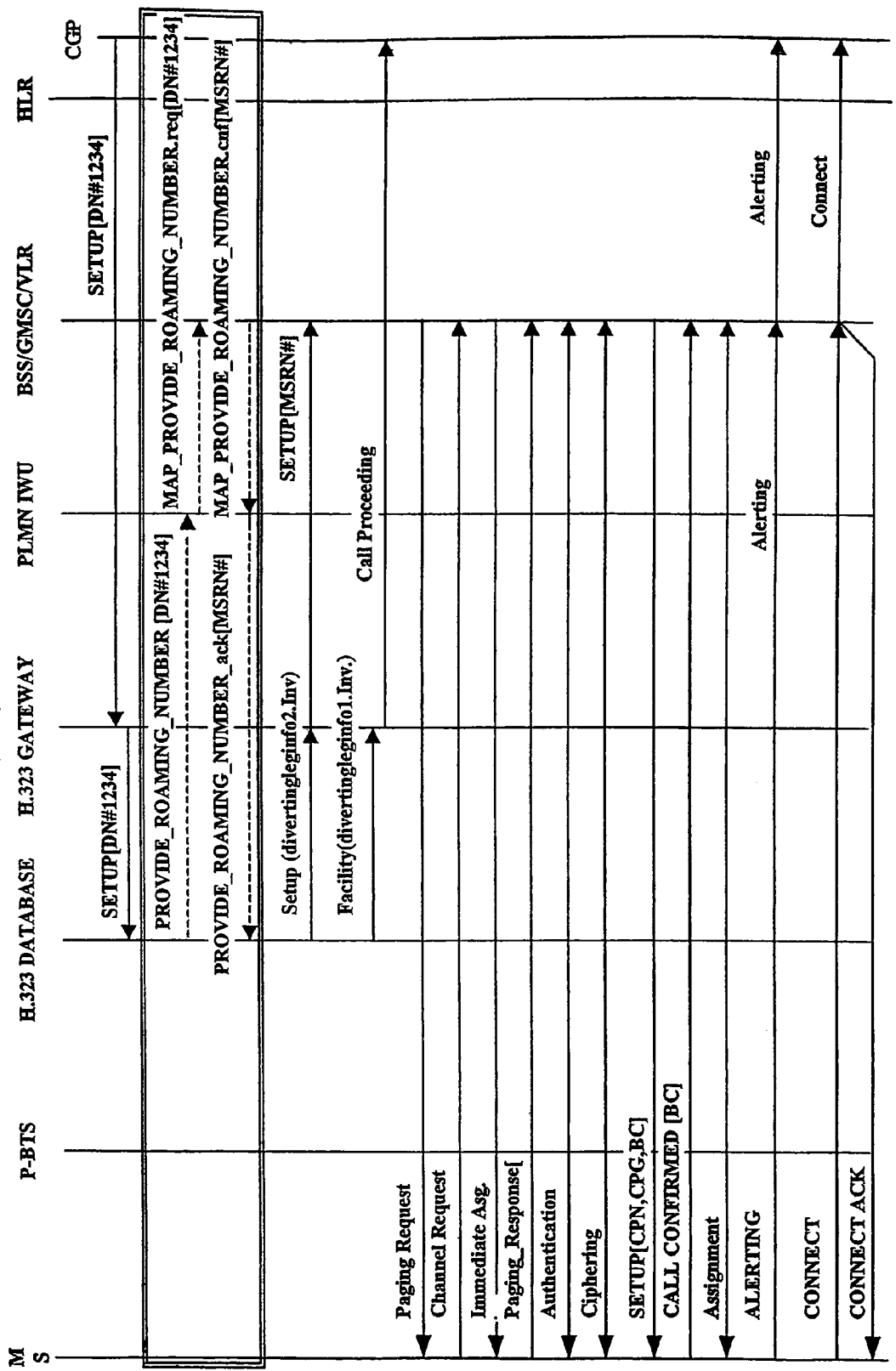
FIG. 8 depicts a Mobile Terminated Call (MTC) to a private user in the public network.

Mobile Terminated Call (MTC) to a Private User in the Public Network FIG. 8.

In FIG. 8 the signaling flows that are used to contact a Private User that is located on the Public Network are presented.

In the first part of the call flow, a SETUP message is received by the H.323 Gateway in the private network from the Calling Part (CGP), this message is forwarded onto the H.323 database 43. The SETUP message contains the Dialed Number (DN) of the user, in this case 1234. As the H.323 database 43 will now try to locate the called user, in order to do this the H.323 database 43 generates the pseudo-MAP PROVIDE_ROAMING_NUMBER message, including adding the SS7 address of MSC/VLR serving the private user, which is forwarded to the PLMN IWU 39-1. The PLMN IWU 39-1 then generates the MAP_PROVIDE_ROAMING_NUMBER to request the roaming number from the MSC/VLR serving the Private Mobile user.

When the serving MSC receives the MAP_PROVIDE_ROAMING_NUMBER request, it checks that the user indicated by the IMSI in the message is present in the VLR of the MSC 17. If the user is present, then the MSC/VLR will select a MSRN from its pool of numbers and return the MAP_PROVIDE_ROAMING_NUMBER confirmation, containing the MSRN, to the PLMN IWU 39-1 indicated in the received message.

The PLMN IWU 39-1, upon receipt of the MAP_PROVIDE_ROAMING_NUMBER confirm message, uses the origination address and transaction identifier to forward its pseudo-MAP PROVIDE_ROAMING_NUMBER message to the H.323 database 43. The H.323 database 43 uses the MSRN received in the PROVIDE_ROAMING_NUMBER message to redirect the users call to the H.323 gateway. In this case since the call has already arrived at the H.323 gateway it must redirect the call using the H.323_SETUP divert leg option with the MSRN# as the diverted to number. On receipt of the H.323_SETUP message, the H.323 gateway can generate a public network SETUP message towards the Public Network, using the provided MSRN#. In order to clean up the call control in the H.323 gateway the H.323 database 43 then uses the Facility message to indicate that the call currently being set up is a diverted call and this operation then generates a Call Proceeding message to the Calling Part (CGP).

When the public network receives the SETUP message, it will begin the standard cellular mobile terminated call procedures with an initial Paging Request. The Mobile Station then responds to the Paging Request and the radio link can be established. Once the correctly ciphered link has been established, the Public Network can then send the SETUP message to the mobile. The mobile responds with the Call Confirmed message. The network can then assign the radio resources and generate the Alerting message for the public network. If the public user is available, the mobile can be answered, which generates the Connect/Connect Ack message sequence as well as the Connect into the public network.

Mobile Terminated Call Operation for Public User in Private Wireless Network—FIG. 9

In FIG. 9, the private network 14 includes a private wireless network 22, having a PLMN IWU 39-1, interconnected to the public wireless network (PLMN) 15. The private wireless network includes a plurality of P-BTSs 27, including P-BTS 27-1, . . . , 27-P, each associated with a corresponding private cell 411 as shown and described in connection with FIG. 4. The public wireless network 15 includes an MSC 17 and a BSS 5 associated with a public cell 11 as shown and described in connection with FIG. 4.

In FIG. 9, the PLMN IWU 39-1 is interconnected to the public HLR 19 of the public wireless network (PLMN) 15 via signaling links (shown as broken lines in FIG. 9). In the embodiment described, these signaling links use the SS7 protocol. The PLMN IWU 39-1 also connects, via a signaling link that uses the IP protocol, to the gatekeeper 41 and the H.323 database 43.

In FIG. 9, the private wireless network 22 includes a gatekeeper 41 that connects to a connection unit 29. The connection unit 29 includes means for interconnecting a mobile station 4, for example, mobile station 4-1 serviced by P-BTS 27-1 in the private wireless network 22, to a call being initiated by the public wireless network 15.

In FIG. 9, for purposes of explanation, it is assumed that mobile station (MS) 4-1 has a calling number #1234. A Call For MS#1234 is present in the MSC 17. The Call For MS#1234 may have originated with a mobile station in the public wireless network 15 or otherwise. The sequence of processing in FIG. 9 for the Call For MS#1234 is represented by circled numbers including circle_1, circle_2, . . . circle_11.

In FIG. 9 at circle_1 the MSC 17 sends a request for routing information to the HLR 19. At circle_2, the HLR 19 sends a request for a roaming number to PLMN IWU 39-1. At circle_3. PLMN IWU 39-1 sends a request for a roaming number to gatekeeper 41 and the H.323 database 43. At circle_4, the H.323 database 43 returns the MSRN (Mobile Station Roaming Number) to the PLMN IWU 39-1. At circle_5 the PLMN IWU 39-1 forwards the MSRN to the HLR 19. At circle_6, the HLR forwards the MSRN to the MSC 17. At circle_7, the traffic at MSC 17 associated with the Call For MS#1234 is forwarded to the H.323 gateway 42. At circle_8, the traffic from H.323 gateway 42 is forwarded to cell router 34. At circle_9y the MSRN for the Call For MS#1234 is forwarded to gatekeeper 41 and the H.323 database 43 to obtain an associated IP address. At circle 10, the associated IP address is returned to cell router 34. In the present example, the IP address for the Call For MS#1234 is assumed to be for the P-BTS 27-1. At circle 11, the call traffic for the Call For MS#1234 is routed to P-BTS 27-1 and thence over the air interface to mobile station 4-1 which is the mobile station having MS#1234.

Mobile Terminated Call Operation for Private User in Public Wireless Network—FIG. 10

In FIG. 10, the private network 14 includes a private wireless network 22, having a PLMN IWU 39-1, interconnected to the public wireless network (PLMN) 15. The private wireless network includes a plurality of P-BTSs 27, including P-BTS 27-1, . . . , 27-P, each associated with a corresponding private cell 411 as shown and described in connection with FIG. 4. The public wireless network 15 includes an MSC 17 and a BSS 5 associated with a public cell 11 as shown and described in connection with FIG. 4.

In FIG. 10, the PLMN IWU 39-1 is interconnected to the MSC 17 of the public wireless network (PLMN) 15 via signaling links (shown as broken lines in FIG. 10). In the embodiment described, these signaling links use the SS7 protocol. The PLMN IWU 39-1 also connects, via a signaling link that uses the IP protocol, to the gatekeeper 41 and the H.323 database 43.

In FIG. 10, the private wireless network 22 includes a gatekeeper 41 that connects to a connection unit 29. The connection unit 29 includes means for interconnecting a mobile station 4, for example, mobile station 4-15 serviced by BSS 15 in the public wireless network 15, to a call being initiated by the private wireless network. The mobile station 4-15 in FIG. 10 is, for example, the same mobile station 4-1 in FIG. 9 that has moved from being serviced by the private wireless network 22 to being serviced by the public wireless network 15.

In FIG. 10, for purposes of explanation, it is assumed that mobile station (MS) 4-15 has the same calling number #1234 as mobile station 4-1 in FIG. 9 and that mobile stations 4-1 and 4-15 are the same unit. A Call For MS#1234 is present in the gateway 42. The Call For MS#1234 may have originated with a mobile station in the private wireless network 22 or otherwise. The sequence of processing in FIG. 10 for the Call For MS#1234 is represented by circled numbers including circle_, circle_2, . . . , circle_10.

In FIG. 10 at circle_1, the gateway 42 sends a request:for routing information to the router 34. At circle_2, the router 34 sends a request for routing information to the gatekeeper 41 and database H.323. At circle_3, the gatekeeper 41 sends a request for a roaming number (Mobile Station Roaming Number) to PLMN IWU 39-1. At circle_4, PLMN IWU 39-1 sends a request for a roaming number to MSC 17. At circle_5, the MSC 17 returns the MSRN to the PLMN IWU 39-1. At circle_6 the PLMN IWU 39-1 forwards the MSRN to the gatekeeper 43 and database 43. At circle_7, the gatekeeper 41 forwards the MSRN to the cell router 34. At circle_8, the cell router forwards the MSRN to the gateway 42. At circle_9, the traffic from H.323 gateway 42 is forwarded to MSC 17. At circle 10, the traffic for the Call For MS#1234 is forwarded to BSS thence over the air interface to mobile station 4-15 which is the mobile station having MS#1234.

While the invention has been particularly shown and described with reference to preferred embodiments thereof it will be understood by those skilled in the art that various changes in form and details may be made therein without departing from the scope of the invention.

What is claimed is:

1. A communication system, comprising:
one or more public networks supporting a first communication protocol, each public network comprising:
a public wired network operable to support communication with one or more public network cells of the public network according to the first communication protocol;
a base station sub-system (BSS) operable to communicate with mobile stations wirelessly through one or more base stations; and
a base station controller (BSC) operable to facilitate communication between the public wired network and the station sub-system; and one or more private networks supporting a second communication protocol, wherein the second communication protocol is a packet-based protocol, each private network comprising:
a private wired local area network (LAN) operable to support communication with one or more private network cells of the private network according to the second communication protocol; and
a plurality of private network stations, each private network station operable to communicate with mobile stations located within a geographic area associated with the station;

an interworking unit operable to:
receive a first update request formatted in accordance with the first communication protocol, the first update request comprising a mobile station identifier identifying a mobile station in communication with one of the base stations;
identify a gatekeeper associated with the mobile station identifier; and
transmit a second update request to the identified gatekeeper, wherein the second update request is formatted in accordance with the second communication protocol and comprises the mobile station identifier and an address for communicating with the mobile station in accordance with the first communication protocol; and the identified gatekeeper operable to:
receive the second update request from the interworking unit; and
associate the mobile station identifier with the address for communicating with the mobile station in accordance with the first communication protocol.

2. The communication system of claim 1, wherein the public wired network is operable to support the first communication protocol by supporting a first wired packet-based protocol.

3. The communication system of claim 1, wherein one or more of the private network stations is further operable to communicate wirelessly with the mobile station using a first packet-based protocol.

4. The communication system of claim 1, wherein one or more of the gatekeepers include a database for associating mobile station identifiers with addresses of the first communication protocol.

5. The communication system of claim 1, wherein the interworking unit comprises:
a first stack operable to process communication received according to the first protocol;
a second stack operable to process communication received according to the second protocol; and
a protocol converter operable to convert communication received according to the first communication protocol to communication for transmission according to the second communication protocol.

6. The communication system of claim 5, wherein the first stack includes a Message Transfer Part (MTP) layer, a Signaling Connection Control Part (SCCP) layer, and a Transactional Capabilities Application Part (TCAP) layer for an Signaling System 7 (SS7) protocol and wherein the second stack includes an Internet Protocol (IP) layer and a Transport Control Protocol (TCP)/User Datagram Protocol (UDP) layer.

7. The communication system of claim 1, wherein each gatekeeper comprises:
a local database operable to communicate according to Internet Protocol (IP) and operable to authenticate the mobile station;

a local client operable to communicate with a remote protocol gateway; and a local interface operable to communicate with the interworking unit.

8. The communication system of claim 1, wherein each gatekeeper comprises an H.323 database for associating mobile station identifiers with Signaling System #7 (SS7) addresses.

9. The communication system of claim 1, further comprising a gateway operable to transmit communication between one or more of the private networks and an external network, the external network supporting communication according to a third communication protocol.

10. The communication system of claim 9, wherein the external network comprises one or more of a Public Switched Telephone Network (PSTN), an Integrated Services Digital Line (ISDN), and a Public Land Mobile Network (PLMN).

11. The communication system of claim 1, wherein a portion of one or more of the private network cells overlap a portion of one or more of the public network cells.

12. A communication system, comprising:
a first network operable to support a first communication protocol, the first network including a first station operable to communicate wirelessly with a mobile station;
a second network operable to support a second communication protocol, wherein the second network comprises one or more local area networks (LANs) and the second communication protocol is a packet-based protocol, the second network coupled to the first network and including a second station operable to communicate wirelessly with the mobile station;
an interworking unit operable to:
receive a first update request from the first network formatted in accordance with the first communication protocol, the first update request comprising a mobile station identifier identifying a mobile station in communication with the first network; and
identify a gatekeeper in the second network associated with the mobile station identifier; and
transmit a second update request to the identified gatekeeper, the second update request formatted in accordance with the second communication protocol and comprising the mobile station identifier and a first address associated with the first network, wherein the first address comprises an address associated with the first communication protocol; and
the identified gatekeeper operable to:
receive the second update request from the interworking unit; and
associate the mobile station identifier with the first address.

13. The communication system of claim 12, wherein the first network is operable to support a first communication protocol by supporting a first packet-based wired protocol.

14. The communication system of claim 12, wherein the first station is further operable to communicate wirelessly with the mobile station using a first packet-based wireless protocol.

15. The communication system of claim 12, wherein the first network comprises a public network and wherein the second network comprises a private network.

16. The communication system of claim 12, wherein the interworking unit comprises:
a first stack operable to process communication received according to the first protocol;
a second stack operable to process communication received according to the second protocol; and
a protocol converter operable to convert communication between the first communication protocol and the second communication protocol.

17. The communication system of claim 16, wherein the first stack includes a Message Transfer Part (MTP) layer, a Signaling Connection Control Part (SCCP) layer, and a Transactional Capabilities Application Part (TCAP) layer for a Signaling System 7 (SS7) protocol, and wherein the second stack includes an Internet Protocol (IP) layer and a Transport Control Protocol (TCP)/User Datagram Protocol (UDP) layer.

18. The communication system of claim 12, wherein the gatekeeper comprises:
a local database operable to communicate according to Internet Protocol (IP) and operable to authenticate the mobile station;
a local client operable to communicate with a remote protocol gateway; and
a local interface operable to communicate with the interworking unit.

19. The communication system of claim 12, wherein the gatekeeper includes a database operable to associate mobile station identifiers with addresses of the first communication protocol.

20. The communication system of claim 19, wherein the database comprises an H.323 database for associating mobile station identifiers with Signaling System #7 (SS7) addresses.

21. The communication system of claim 12, further comprising a gateway operable to transmit communication between the second network and a third network, the third network supporting communication according to a third communication protocol.

22. The communication system of claim 21, wherein the third network comprises one or more of a Public Switched Telephone Network (PSTN), an Integrated Services Digital Line (ISDN), and a Public Land Mobile Network (PLMN).

23. The communication system of claim 12, wherein the first network comprises a public wireless network.

24. The communication system of claim 12, wherein the first network comprises a private wireless network.

25. The communication system of claim 12, wherein the first station is further operable to provide communication service to a first cell area, and wherein the second station is further operable to provide communication service to a second cell area, and wherein at least a portion of the second cell area overlaps at least a portion of the first cell area.

26. A method for providing communication, comprising:
receiving information wirelessly at a first station from a mobile station, wherein the information received includes a mobile station identifier associated with the mobile station;
transmitting at least a portion of the information to an interworking unit over a first network according to a first communication protocol;
identifying a gatekeeper associated with the mobile station identifier;
transmitting at least a portion of the information and an address associated with the first communication protocol to the identified gatekeeper according to a second communication protocol, wherein the second communication protocol comprises a packet-based protocol;
receiving, at the identified gatekeeper, at least a portion of the information and the address associated with of the first communication protocol;
associating the mobile station identifier with the address associated with the first communication protocol; and communicating with the mobile station over the first network using the address associated with the mobile station identifier.

27. The method of claim 26, wherein transmitting information over a first network according to a first communication protocol comprises communicating information according to a first packet-based wired protocol.

28. The method of claim 26, wherein receiving information wirelessly at the first station comprises receiving information according to a first packet-based wireless protocol.

29. The method of claim 26, wherein transmitting information over the first network comprises transmitting information over a private network and wherein communicating over a second network comprises communicating over a public network.

30. The method of 26, further comprising:
authenticating the mobile station using a local database operable to communicate according to Internet Protocol (IP);
communicating with a remote protocol gateway using a local client operable; and
communicating with the interworking unit using a local interface.

31. The method of claim 26, wherein associating the mobile station identifier with the address of the first communication protocol comprises associating the mobile station identifier with a Signaling System #7 (SS7) address in an H.323 database.

* * * * *